INVENTOR
Armand A. Bonnard

May 25, 1965 A. A. BONNARD 3,185,178
CYLINDRICAL SQUEEZE-TYPE DIRECTIONAL VALVE
Filed Oct. 15, 1962 2 Sheets-Sheet 2

INVENTOR 3,185,178
CYLINDRICAL SQUEEZE-TYPE DIRECTIONAL
VALVE
Armand A. Bonnard, 101 Sherwood Drive,
Santa Barbara, Calif.
Filed Oct. 15, 1962, Ser. No. 231,330
1 Claim. (Cl. 137—625.29)

This invention relates to a valve used in tank trucks of the petroleum industry for delivery of refined products; its function being to, by proper selection, cause the fluid to flow by gravity through the valve to the metering devices, or cause the fluid to flow through the valve to a pump suction line; then said fluid re-enters and goes through the valve, through the same connection as fluid would go when gravitating said fluids, the gravitating passage being shut off when the proper selecting action takes place.

The construction of this valve is new and useful, being built as follows: valve body having three sections, the main center section being cylindrical and therefore free of any shouldered protrusion into main flow stream in said body, thus eliminating valve seat shoulders; the communication of the different passages are accomplished by the parallel travel of an O-ring carrying double headed piston, wherein all the operating mechanism is confined within the body of the valve, thereby eliminating leakage as there are no exposed stems or shafts extended to the atmosphere. By the valve being constructed in three sections, the end sections can be placed at any desired angle, owing to the type of V clamp and O-ring type seal used to hold valve together.

The object of this valve is to direct fluid out of the valve two different and separate ways into the valve again after the fluid has left the valve and gone through a pump, and from the discharge side of the pump, re-enters the valve going through the proper chamber to the meter, the same as the gravity flow would use when the selection would be made for that operation.

These and other objects, features and advantages will be apparent from the annexed specification in which.

Figure 1:
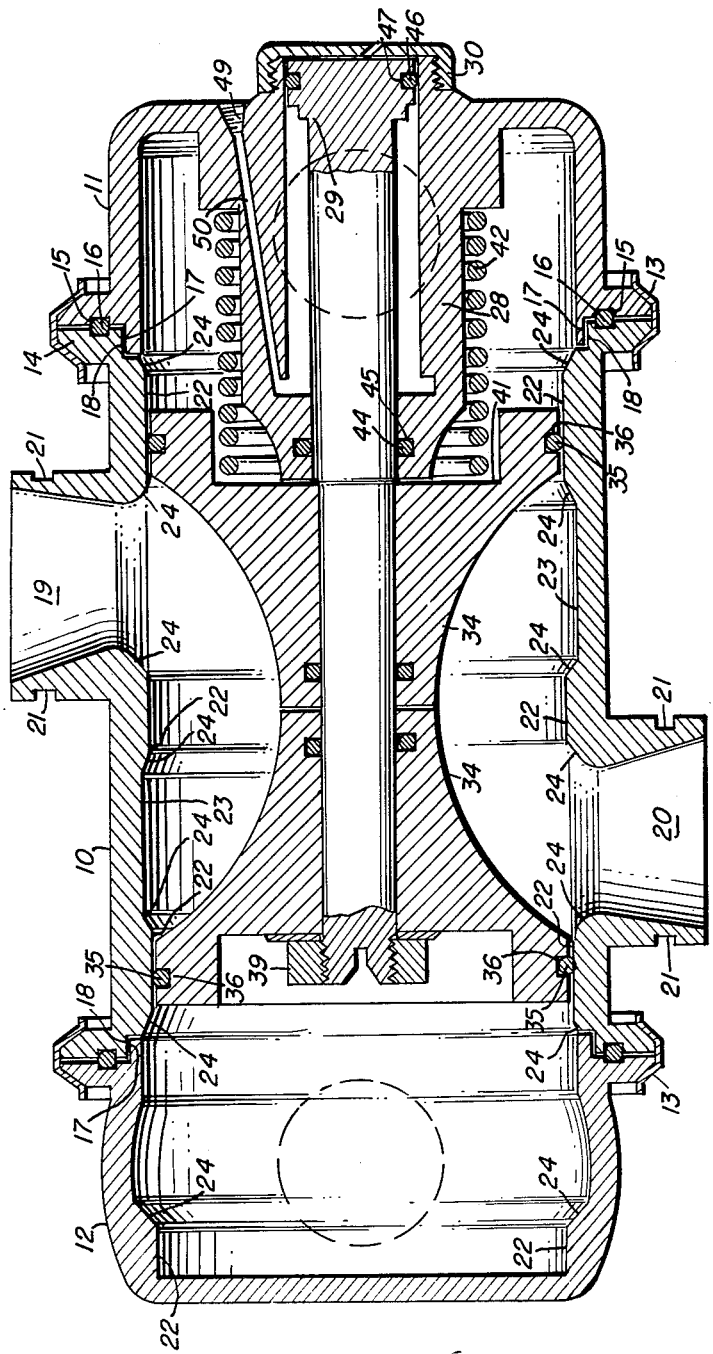
FIGURE 1 is horizontal section through a valve body embodying the present invention.

Refering now more particularly to the drawings, there is shown a valve of three body sections comprising castings 10, 11 and 12, held together by V-type clamp rings 13, tightened around specially machined flanges 14 having rectangular grooves 15 on each flange to retain and compress O-ring type seals 16; also machined on each inside diameter at the smaller size are machined shoulders 17, recessed sections to act as aligning shoulders 18. Casting 10 has two tubes 19 and 20 with grooves 21 machined on the outside of each tube to be connected to other piping with misalignment absorbing type couplings; tubes 19 and 20 are properly offset to each other as shown on drawing FIG. 1. Portions 22 of casting 10 are machined to desired standard size; portions 23 are machined a slightly larger size than portions 22 and the difference in diameters are connected by tapered, machined surface 24.

Figure 2:
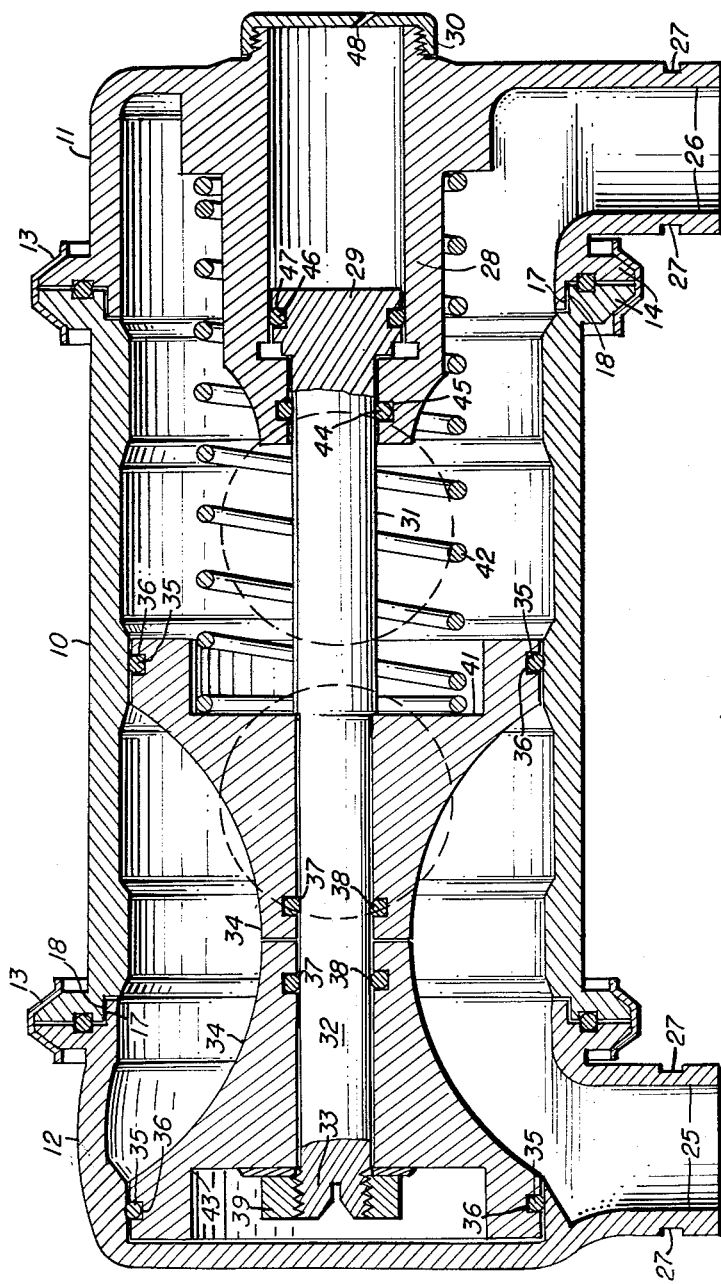
FIGURE 2 is vertical section of FIGURE 1.

Castings 11 and 12 are of a cap type casting; both have connecting tubes, one each, 25 and 26, FIG. 2, with grooves 27 machined in tube to receive misalignment absorbing type of coupling; casting 11 has, in addition, a power cylinder 28 extending inwardly, within which is a piston 29 equipped with a stem 31 and 32, which is shouldered some distance from the piston head, and threaded at the far end 33 for the purpose of holding the two halves of the double headed O-ring carrying pistons 34, which in turn carries seal O-rings 35, inserted in grooves 36. These O-ring carrying pistons 34 have a machined groove 37 in their inside bore to receive O-ring seals 38 to seal reduced stem portion 32 of piston stem 31. Piston halves 34 are purposely machined to resemble spools to cause liquids to swirl around it, rather than spools having side surfaces coming straight down, making 90° sections where vacuum turbulences could be set up, thus retarding flow of the liquid. These spool like pistons are firmly held together against the shoulder 40 of stem 31 and 32 by washer and nut 39 screwed up tight, both piston halves are recessed 41 and 43; 41 to act as a spring center guide for spring 42. The recess 43 of spool 34 is for the purpose of keeping washer and nut 39 from protruding past the outer edge of said spool. Piston stem 31 is sealed in power cylinder 28 by O-ring 44 in machined groove 45; piston 29 is also sealed to the inside of power cylinder 28 by O-ring 46 in groove 47. A threaded cap 30 is provided which screws to an extension piece on casting 11; this cap 30 acts as a stop for piston 29 and has a small hole 48 drilled at an angle, this hole being a vent to atmosphere. The threaded part 49 of casting 11 is for receiving a fitting which will furnish fluid under pressure to passage 50 communicating to the underside of piston 29.

The operation of the above described device is as follows: When fluid, under pressure, is fed through fitting fastened to threaded part 49 and passage 50 to the left side of piston 29, as shown in FIGURE 1, is caused to move to the right until the right side of piston 29 comes in contact with cap 30, this travel has completed the partitioning action for gravitating by placing the spool-type O-ring carrying pistons 34 with O-rings 35 in grooves 36 in their proper positions on machined surfaces 22 left and 22 right of casting 10; this action of pistons and O-rings 35 traveling to the right has caused the pistons to travel over the slightly larger bores 23, and when tapers 24 were reached they started to compress O-rings 35 to the size caused by their being entered into the smaller diameter 22, thereby creating a tight partition seal at both ends of spool-type double headed pistons 34. The flow of fluid with the spool in this position is called the gravity flow position; liquid flows from 19 around the spool and out through 20 to said metering device (not shown), or it can flow from 20 through the valve and out 19, depending how valve is set up for whichever operation is desired of the valve. It will also be noted that spring 42 is fully compressed; this fact does not mean anything pertaining to this operation, and the function of 42 will be explained in the next operation.

When pressure is released and piston 29 is returned to its natural position through the force stored in coil spring 42 (shown in FIGURE 2), piston 34 is returned to the left of the valve body, and its returning travel is brought to a stop by the left side of piston 29 striking the left end of 28 power cylinder travel; it can be noted at this time that the power cylinder piston 29 controls the positioning of pistons 34 on the machined surfaces 22. The right side of piston 34 is brought to rest with the sealing O-ring 35 positioned in the center of the center machined surface 22 of casting 10, causing this portion of piston 34 to become a partitioning wall, sealing off the right and the left side of the valve body; this position of the piston is called the pumping position. The flow of fluid is now diverted from tube connection 19 to tube connection 26, where it leaves the valve and goes to the pump suction line, then through the pump to the pump discharge line, where it is connected to tube 25 and re-enters the valve body on the left side to flow from tube connection 25 to tube connection 20; from there to the same metering device as used for gravitating. With the connections made as mentioned above, this valve can also act as a pressure relief valve in the event a shutoff valve has been closed against the pump. The reversed operation is accomplished by using tube connection 20 to bring the fluid into the valve body and connecting the pump suction line to connecting tube 25; fluid would then leave the valve body and go through the pump, and by the pump discharge being connected to tube connection 26, would flow out through connection tube 19 to the metering device. Connected this way, positive position is maintained by the partitioning piston 34 as fluid pressure, built up on the right side of spool 34 by the pump, is cooperating with the forces stored up in the coil spring 42, thereby holding piston 34 with the help of the pump created suction and pump pressure in a given position. Both of these methods of connection are desirable at one time or the other and shows this valve may be used in more than one direction and purpose.

I claim:

A cylindrical type directional valve comprising; a cylindrical housing having axially spaced end portions, a first cap member sealingly mounted on one end portion, a second cap member sealingly mounted on the other end portion, said cylindrical housing and cap members defining a valve chamber, an annular piston valve member slidably mounted in said valve chamber, sealing means carried about each end of said piston, a pair of spaced ports in said cylindrical housing intermediate said sealing means in one position of said piston valve for fluid communication therebetween, each end cap member having a port communicating with the interior thereof, each of said sealing means in said one position of the piston valve blocking the cap member ports from the ports in said cylindrical housing, a power cylinder depending from said first cap member, a piston slidably, sealingly mounted in said cylinder, a shaft connecting said piston with said piston valve, said shaft passing through an opening in the cylinder and sealingly engaged with the walls thereof, passage means communicating with one side of said piston for supplying fluid to urge said piston valve to said first position, spring means between said first cap member and said piston valve for urging the piston valve to a second position whereat one of the sealing means is located intermediate said cylinder ports thereby preventing communication therebetween.

References Cited by the Examiner

UNITED STATES PATENTS

| 1,675,305 | 6/28 | Dake | 137—625.48 |
| 1,716,881 | 6/29 | Francis | 137—625.2 |
| 2,889,690 | 6/59 | McGrath | 137—625.29 XR |

FOREIGN PATENTS

| 1,150,154 | 8/57 | France. |
| 86,012 | 6/55 | Norway. |

M. CARY NELSON, *Primary Examiner.*

MARTIN P. SCHWADRON, *Examiner.*